(No Model.)
2 Sheets—Sheet 1.
G. M. ALLEN.
GAS ENGINE.
No. 301,320. Patented July 1, 1884.
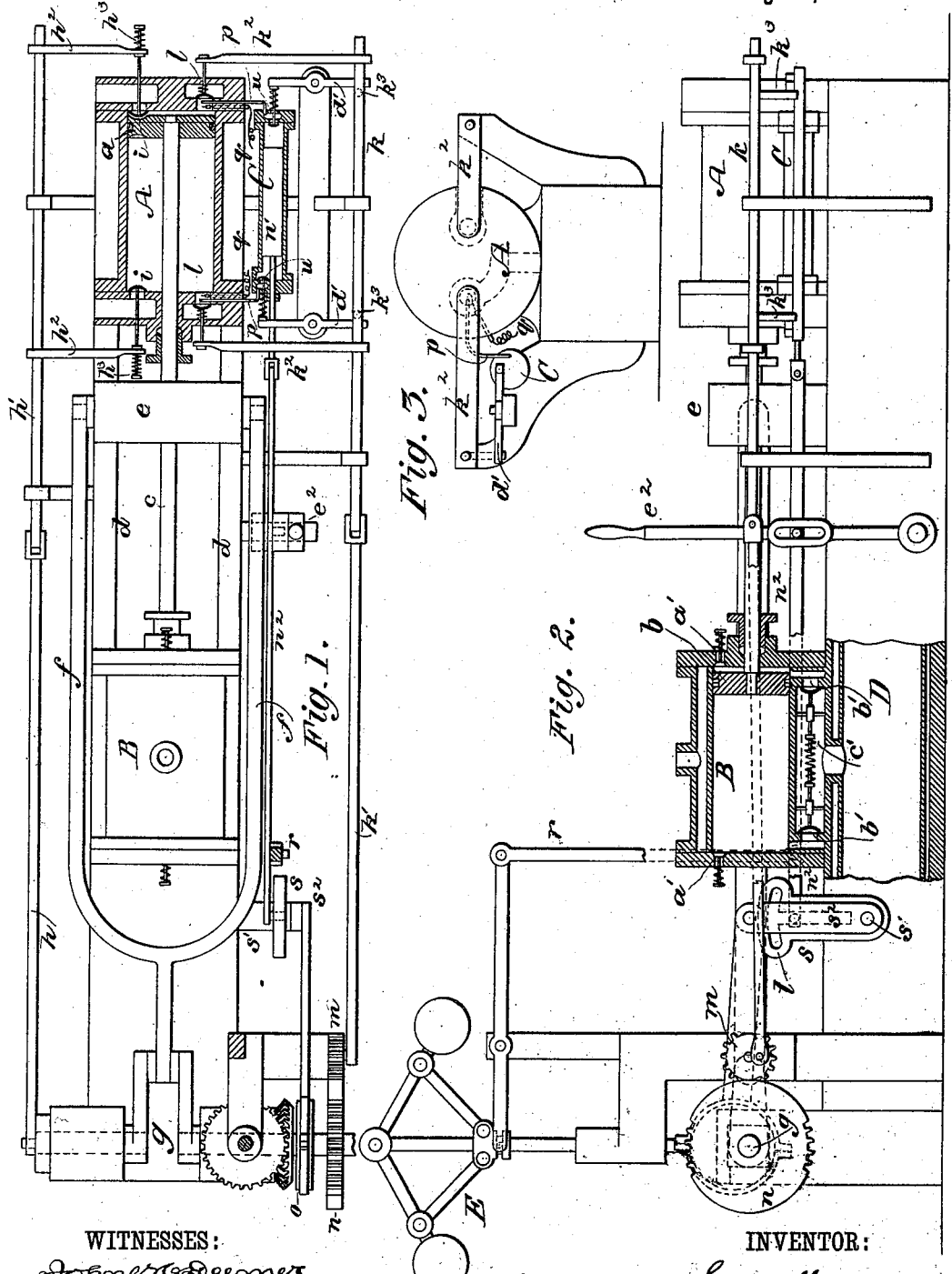
WITNESSES:
INVENTOR:
G. M. Allen
BY Munn & Co.
ATTORNEYS.

(No Model.)    G. M. ALLEN.    2 Sheets—Sheet 2.
GAS ENGINE.

No. 301,320.    Patented July 1, 1884.

WITNESSES:
Johnet G. Deemer
C. Sedgwick

INVENTOR:
G. M. Allen
BY Munn & Co.
ATTORNEYS.

UNITED STATES PATENT OFFICE.

GEORGE M. ALLEN, OF TERRYSVILLE, CONNECTICUT.

GAS-ENGINE.

SPECIFICATION forming part of Letters Patent No. 301,320, dated July 1, 1884.

Application filed October 2, 1883. (No model.)

*To all whom it may concern:*

Be it known that I, GEORGE M. ALLEN, of Terrysville, in the county of Litchfield and State of Connecticut, have invented a new and Improved Gas-Engine, of which the following is a full, clear, and exact description.

In my improved gas-engine I employ a working-cylinder in which the piston is moved by the expansion of heated air and gases, and in connection therewith a compression-cylinder, in which air is compressed for supplying the working-cylinder. Gas is supplied to the cylinder at the same time that the compressed air is allowed to enter, and the gas-jet is ignited for heating and expanding the air. There is no explosion, the engine being practically a hot-air motor, in which the gas is used in greater or less quantity, as may be required, and the air admitted is greatly in excess of that needed for the combustion of the gas, so that the temperature is perfectly under control, and may be kept so low that the cylinder will need no water-jacket.

Reference is to be had to the accompanying drawings, forming a part of this specification, in which similar letters of reference indicate corresponding parts in all the figures.

Figure 4:
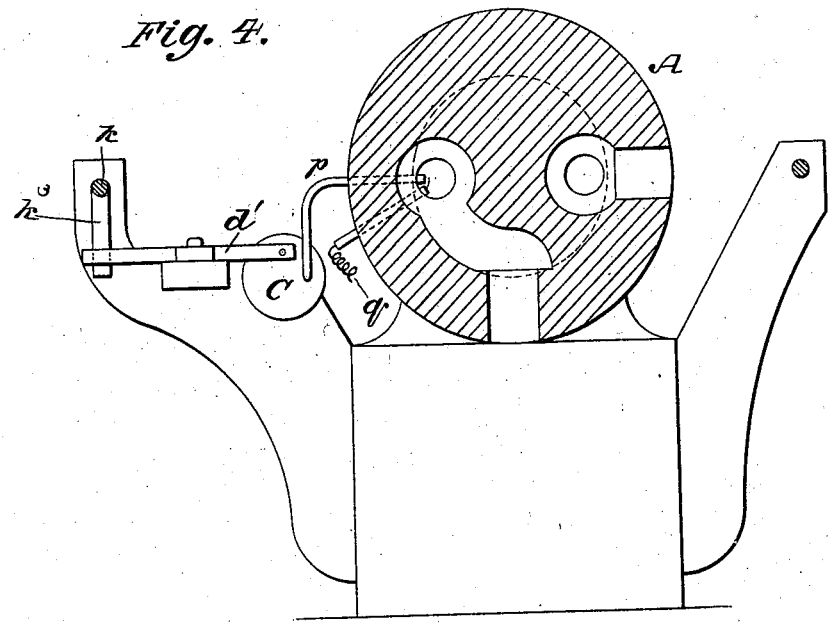
Figure 5:
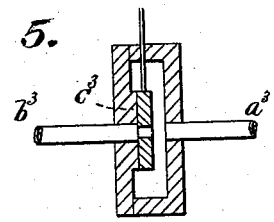

Figure 1 is a plan view, partly sectional, of my improved engine. Fig. 2 is a partly sectional side elevation. Fig. 3 is an end view of the working-cylinder and the mechanism for operating the valve. Fig. 4 is a transverse section through the head of the working-cylinder, and Fig. 5 is a detail view.

A is the working-cylinder; B is the compression-cylinder, and C is the gas-feed pump. The two cylinders are placed in line and the piston-heads $a$ $b$ connected upon one rod, $c$, in the manner of a direct-acting engine. The compression-cylinder B may be formed with a water-jacket; or, if desired, this cylinder B may be used without any jacket.

$d$ $d$ are the slides, carrying a cross-head, $e$, which is made heavy, in order that the velocity imparted to the cross-head during the first part of the stroke shall be sufficient to nearly carry the compressing-piston to the end of the stroke without the aid of a fly-wheel.

$f$ is a connecting-rod, forked to pass at opposite sides of the cylinder B, the forked ends being connected to the cross-head $e$ and the opposite end to a crank on the engine-shaft $g$.

$h$ is a rod operated by a crank on the shaft $g$ and connected to the valve-rod $h'$, that operates the exhaust-valve $i$ of the cylinder A.

$k$ is a rod for operating the valves of the gas-pump C and induction-valves $l$ of the cylinder A, and $k'$ is a connecting-rod from the valve-rod $k$ to a crank-pin on a pinion, $m$, which is operated by a sectional gear-wheel, $n$, on the shaft $g$. The compression-cylinder B is provided with inlet-valves $a'$ for admission of air, and with outlet-valves $b'$ for admitting air to a chamber, $c'$, that is connected to a reservoir, D, in which compressed air is stored. The rod $h'$, for operating the exhaust-valves $i$, is provided with arms $h^2$, through which the stems of the valves $i$ pass, the stems being provided with a collar, against which the arms $h^2$ act to open the valve, and between the arms $h^2$ and the collars on the outer ends of the stems are springs $h^3$, against which the arms press in a direction for closing the valve, so that when either valve is closed the arms $h^2$ upon the spring serve to hold it tightly to its seat. The induction-valves $l$ $l$ are closed by springs upon their stems, and are connected in a similar manner to arms $k^2$, projecting from the rod $k$. The rod $k$ is also provided with downwardly-projecting arms $k^3$, which act upon levers $d'$ for operating the valves $u$ in the heads of the gas-pump. The gas-pump is provided with a piston, $n'$, that is operated by a reciprocating rod, $n^2$, connected to an eccentric, $o$, on the shaft $g$. From the ends of the gas-pump separate pipes $p$ lead into the ends of the cylinder A in front of the induction-valves $l$, so that the gas-jet shall be mixed with the air entering the cylinder.

$q$ $q$ are wires of an electric circuit, which pass through insulating-tubes in the ends of the cylinder A and across the air and gas inlets. These circuit-wires are to be connected to a suitable generator of electricity so that the portion at the gas-inlet, which is formed of platinum, may be heated to incandescence, for the purpose of igniting the gas; or, in place of the electric wires, a continuously-burning gas-jet may be employed. The rod $k$, operating the gas and air valves, is fitted for movement by the sectional gearing $m'n$, so that a quick opening and closing will be given to the valves and a pause between the two movements. The crank-pinion $m$ is proportioned to the operating-gear $n$ so that the former makes half a revolution in that part of the stroke during which it is desired to keep the inlet-valve open, each half-revolution being given by the teeth on one side of wheel $n$, so that the valve at one end of cylinder A shall be opened at one semi-revolution, and the valve at the other end at the next semi-revolution, thereby opening and closing each valve in every revolution of the shaft.

For regulating the amount of gas supplied to the cylinder, I employ a centrifugal governor, E, which is connected to a rod, $r$, which in turn is attached to the connecting-rod $n^2$ of the gas-pump C. The outer end of the rod $n^2$ engages by a pin a vertical slot in a link, $s$, that is attached to a rock-shaft, $s'$, which also carries an arm, $s^2$, that is connected to the eccentric $o$, so that, the link being vibrated by the eccentric, the rod $n^2$ and the piston $n'$ are reciprocated. The slot in the link $s$ is connected at its upper end to a cross-slot, $t$, in the link. By this construction and arrangement, as the governor-balls rise the pin on the rod $n^2$ is moved downward in the slot of the link $s$ and inward to the rock-shaft $s'$, thereby shortening the movement of the piston $n'$, and thereby lessening the quantity of gas forced into the cylinder. When the balls fall, the rod is carried upward and the motion increases until the pin enters the slot $t$, when the link will vibrate without imparting motion to the piston, thus stopping the gas-pump entirely. In case the governor becomes disconnected from the engine-shaft, the pin connecting the rod $n^2$ to the link $s$ will be carried into the slot $t$, and the engine must stop. This arrangement has the further object to allow the pump C to be worked by means of a hand-lever, $c^2$, when the engine is to be started. A suitable arrangement will be provided for depressing the rod $n^2$ as soon as the engine starts, so as to insure the working of the pump until the balls of the governor have risen. This may be done by grasping the rod $n^2$ with the hand directly; or a small handle may be attached.

In the operation of the engine, the valve $l$ at one end of cylinder A being opened, the compressed air passes into the cylinder from the receiver, and at the same time, the valve $u$ of the gas-pump being opened, the gas already compressed by the action of the piston $n'$ enters the cylinder beneath the valve $l$ and crosses the heated platinum wire $q$. The gas, being thus lighted, burns in the air entering the cylinder. After the piston $a$ has completed a part of its stroke, the valve $l$ is closed, and the heated air and products of combustion expand until they reach atmospheric pressure. If this occurs before the end of the stroke is reached, the eduction-valve $i$ is opened by the pressure of the atmosphere, thus preventing any further decrease of pressure. The pump may feed gas alone or gas diluted with air, in which latter case there will be two induction-valves at each end of the pump, one for air and the other for gas. There is no explosion and practically no explosive mixture is admitted to the cylinder. The object of diluting the gas with air is to insure complete combustion, thus preventing a smoky flame, and also allowing the use of a larger pump, which will be more easy to regulate, and there will be less gas left in the passages from the pump to the working-cylinder. The greater part of the air is admitted through the valve $l$ from the receiver D, and this amount of air being largely in excess of that needed for the combustion of the gas, the temperature produced will be comparatively low, and may be readily regulated. Between the chamber containing the valve $l$ and the reservoir for compressed air there may be a check-valve opening from the reservoir, so as to prevent the return of the air should the pressure be increased by the burning of the gas. In place of gas, liquid hydrocarbons may be used. In that case the liquid is to be placed in a vessel slightly elevated above the compressed-air reservoir, and a small tube passed from the bottom of the vessel will enter a pipe which traverses the length of the compressed-air reservoir, and so arranged that any back-pressure will force the liquid back into the vessel. This is in order that the heat evolved in the compression of the air will be utilized to vaporize the hydrocarbon, and the vapor, in passing through the length of the pipe, will become superheated, and may be taken into the pump the same as gas; or the liquid can be vaporized by utilizing the exhaust of the working-cylinder, if the temperature be high enough; or else a separate heater or similar means may be used for vaporizing the hydrocarbon. The exhaust from the working-cylinder may be carried off by a pipe, or may be allowed to escape directly from the cylinder-heads into the air. When gas is to be discharged from the pump more or less mixed with air, the construction will be as shown in Fig. 5, and with this device the governor for regulating the stroke of the pump-piston may be dispensed with. This device is applied in connection with the inlet-pipe of the gas-pump, and arranged so that the gas, on passing to the pump, enters at the opening $a^3$, and, passing through an aperture in a slide, $c^3$, enters the pump through the opening $b^3$. The stem of the slide $c^3$ is connected with the governor, so that when the speed increases the slide is drawn up and decreases the size of the passage, so that less gas is drawn in in proportion to the air drawn into the pump through a separate air-valve; and in case the governor becomes disengaged from the engine-shaft, the slide $c^3$ will drop down and cut off the supply of gas, thus stopping the engine.

Having thus fully described my invention,

I claim as new and desire to secure by Letters Patent—

1. The method of operating a gas-engine, which consists in compressing air and storing it in a reservoir, conducting the air and simultaneously therewith a charge of gas under pressure to the working-cylinder, the air being greatly in excess of the quantity required for combustion, and finally igniting the gas as it passes with the air into the cylinder, substantially as described.

2. In gas-engines, the combination and arrangement, substantially as described, of the working-cylinder A, the compression-cylinder B, the cross-head e, the gas-pump C, and the air-reservoir D.

3. In a gas-engine, the combination, with the working and gas-pump cylinders A and their valves, of the valve-rod $k$, bars $d'\,k^2$, connecting-rod $k'$, and sectional gearing $m\,n$, substantially as herein shown and described.

4. In gas-engines, the combination of the pump-operating rod $n^2$, the slotted link $s$, having a cross-slot, $t$, the eccentric $o$, and the governor E, connected to the rod $n^2$, substantially as described, for operation as set forth.

5. In a gas-engine, the combination, with the pump-operating rod $n^2$, of the operating-link $s$, formed with the cross-slot $t$, and the hand-lever $e^2$, connected to the rod, substantially as and for the purpose specified.

GEORGE M. ALLEN.

Witnesses:
W. S. WALKER,
C. SEDGWICK.